Patented Aug. 1, 1933

1,920,735

UNITED STATES PATENT OFFICE 1,920,735

PROCESS OF EFFECTING BACTERIAL FERMENTATION WITHOUT MULTIPLYING THE CELLS

Stefan Bakonyi, Dessau, Germany, assignor to Deutsche Hydrierwerke A.-G., Berlin-Charlottenburg, Germany, a Corporation of Germany No Drawing. Application January 31, 1929, Serial No. 336,667, and in Germany February 21, 1928

9 Claims. (Cl. 195—20)

This invention relates to a method of effecting bacterial fermentation without multiplying the cells during the fermentation process.

At present the fermentation of mashes containing carbohydrates is effected by adding bacteria as inciters of fermentation to the mashes to be fermented, and so conditioning the mash that the bacteria are multiplied simultaneously with the fermentation of the mash itself. Thus the essential feature of such processes is the simultaneous performance of the propagative and the fermentative functions. Apparently it has been assumed that no multiplication of cells can take place without fermentation and no fermentation without multiplication of cells. Therefore, it has been thought that mashes poor in certain substances indispensable for propagation, such as albumen, phosphates or the like, could not be readily fermentated, as the failing of the propagative function would entail the failing of the fermentative function.

It has already been proposed, for instance, to add inert substances and nitrogenous nutrients to a solution (wort) of molasses to render possible the further course of the propagative function and the fermentative function coupled therewith. However, I have discovered that it is not necessary to carry on simultaneously the propagation of bacteria and the fermentation, which procedure is, in fact, subject to the following disadvantages:

(1) Part of the substance to be fermented being transformed to a mass of living bacteria, the yield of fermentation products is substantially decreased;

(2) The beginning of the fermentation of the mashes is considerably retarded, as the propagation of the bacteria requires a considerable time;

(3) The bacteria must be propagated only in sterile mashes in order that the development of undesired foreign organisms may be eliminated, for which reason a considerable amount of heat is required for sterilization when the propagation of bacteria and fermentation are conducted in the same mash;

(4) The optimum temperature for propagation and for growing differ, in some cases, from the optimum temperature for fermentation and an undisturbed course of fermentation is not assured, even when the most favorable conditions of temperature for fermentation exist if the bacteria must propagate during the fermentation.

These drawbacks are not avoided by the expensive and troublesome addition of nutrients, more particularly as such nutrients are often strongly infected by other bacteria. Moreover some mashes, especially solutions of molasses, may not be heated up to the temperature at which the spore formers are killed, because, owing to the resulting caramelization, a further diminution of the yield will result.

I have found that contrary to the hitherto prevailing views all these drawbacks are avoided by allowing the propagative function and the fermentative function of the bacterial inciters of fermentation to act separately. For this purpose the bacteria are at first allowed to develop in a suitable nutritive mash portion promoting their propagation and growing to such an extent that the enzymatic energy of the bacteria mass then present will suffice for completely fermenting the main mash proper. The bacteria mass at its maximum vitality is then added to the main mash which, however, is poor in vital nutrients and is not favorable to propagation. Accordingly the further multiplication of cells is prevented but the cellular energy of the bacteria mass (which energy was released by the failing of the propagative function) spends itself as fermentative energy, whereby at once a rapid and complete fermentation of the mash, which otherwise either would not ferment or would ferment only with difficulty, takes place, although the bacteria themselves perish during the fermentation process.

The separation of the propagative and fermentative functions as here described presents the following advantages:

(1) The available substances of the above mentioned main mash portion are completely transformed to fermentation products, as the bacteria cells no longer grow, are no longer propagated, do not form spores or other permanent forms, nor accumulate reserve nutrients in their bodies, but only act as a catalytic mass which is completely consumed during fermentation.

(2) The fermentation of the main mash begins at once upon addition of the bacteria thereto without being retarded by the period of incubation otherwise connected with the augmentation of the bacteria.

(3) The necessity of sterilization of the main mash and the difficulties connected therewith, especially the deterioration, by caramelizing, of the substances to be fermented are avoided, the main mash being composed in such a manner that a sensible propagation of bacteria therein is no longer possible. Therefore the mash is quite insensible against the gravest infections.

(4) The fermentation of the main mash may be carried out at a temperature differing from that of the growing optimum so that the inoculating bacteria after first being developed up to maximum vitality in the nutritive mash can produce its highest fermentative energy when fermenting the main mash.

(5) Any additions of nutrients to the mashes to be fermented are superfluous or even detrimental, as the avoidance of propagation of the bacteria, as also the propagation of fermentation inciters of foreign species, forms a preliminary condition for carrying out the process.

For example, a nutritive mash portion designed for propagation of the bacteria and containing albumen, phosphates and the like for inoculating the main mash is preferably sterilized in a diluted mash of a suitable other nutrient such as corn, potatoes, etc. containing, for instance, 3% of a carbohydrate and inoculated with the bacteria suited for the process which it is desired to operate. The temperature for propagation should be preferably between 28 and 38° C. For example, for making butanol and acetone the mash may be inoculated with bacteria of the "butylobacter" group described in my copending application Serial No. 327,751, filed Dec. 21, 1928. The preparation of culture of the "butylobacter" bacteria may be carried out by selecting a natural mixed culture and attaching the same to a solid substrata which is subject to change by the action of the biochemical agents such as particles of grain. The substrata should be freely movable in a suitable solution. A culture thus is formed. Effective bacteria may be obtained by systematic selection, viz. by first adding to the culture to be employed and the nutrient substrata small quantities of the butanol and acetone to be produced. Automatic selection thus takes place. The bacteria which are non-resistant to butanol and acetone are eliminated while the resistant bacteria survive. After suitable development of the bacteria a further selection under the microscope is desirable. By preparation of a number of separate samples and suitable selection of the best of those samples the strongly degenerated (granulated or deformed) individuals are eliminated and the microorganisms which show uniform protoplasm and normal shape are chosen for further development. After such further development a further microscopic investigation of the samples using fixed and colored preparations is desirable. The samples to be finally employed are those in which the microorganisms show good formation of culture and fixation to the solid nutrient substrata. A sterilized nutrient substrata to which about 1% of butanol and acetone is added is inoculated with these selected samples and incubated for twenty-four hours after which the microscopic selection is preferably repeated to further improve the quality of the bacteria. The operation of microscopic selection and incubation of the selected cultures is repeated until cultures of satisfactorily normal appearance showing a strong formation of culture are obtained. The development of the culture may be tested electrometrically to ascertain concentration of the hydrogen ions, so that the operator is able to superintend statistically the augmentation of the bacteria, the maturing of the cell contents, and the acidity of the nutritive mash. When the bacteria mass has attained its maximum development (which may be recognized, for instance, when employing the above-mentioned bacteria of the "butylobacter" group as inciters of butanol fermentation, from the fact that when the nutritive mash as electrometrically tested shows the utmost attainable degree of acidity the bacilli are grampositive) the mass is added to the main mash. This is, for instance, carried out in such a way that in a fermenting vat having a capacity of 50,000 liters 4,000 to 8,000 kilograms of molasses are diluted with lukewarm water up to 36,000 liters and 4,000 liters of the above-mentioned nutritive mash containing the propagated bacteria are added at the required fermenting temperature (approximately 37° C.). The concentration of the hydrogen ions in the wort of molasses is preferably adjusted, by adding an acid or an alkali to equal the final concentration of the hydrogen ions of the wort serving for the inoculation, only small quantities of acid or alkali being needed for this purpose. Of course, in fermentations which produce acids the necessary precipitating reagents which are usually employed for neutralizing the acid and for precipitating the same are also added gradually.

The fermentation usually begins at once with extraordinary vigor and is finished within 30 to 50 hours depending upon the product being formed. After the fermentation is completed the fermented mash shows on microscopic examination nearly exclusively hypertrophic and dead bacteria, but no spores or other permanent forms.

The process remains unchanged when instead of the particular bacteria indicated in the foregoing example bacteria are used such as are employed for producing, for instance, lactic or butyric acid, or for simultaneously producing ethylalcohol and acetone, or for obtaining isopropyl alcohol or the like.

I claim:—

1. The process of effecting fermentation which comprises first propagating bacteria in a sterile mash and then conducting fermentation by the aid of said bacteria in a mash unfavorable to propagation but favorable to fermentation.

2. The process of effecting fermentation which comprises adding bacteria to a mash particularly adapted to promote propagation of the bacteria, maintaining the mash at a temperature conductive to propagation for a period of time and then adding the bacteria to a mash adapted to promote the fermentative function but not the propagative function.

3. The process of effecting fermentation which comprises adding bacteria to a sterile mash rich in vital nutrients for propagation of the bacteria, maintaining the mash at a suitable temperature for propagation of the bacteria until the bacteria mass attains its maximum vitality, adding the bacteria mass to a mash poor in vital nutrients and unfavorable to propagation but capable of fermentation and maintaining said mash at a temperature favorable to fermentation.

4. The process of effecting bacterial fermentation without multiplying the cells during fermentation, which comprises adding a bacteria culture having the maximum of its physiological activity to a mash poor in nutritive ingredients favorable to propagation of bacteria but rich in fermentable ingredients.

5. The process of effecting fermentation of a mash which is fermentable by the organisms to be utilized but which is unfavorable to cell growth or multiplication of said organisms, which comprises cultivating said organisms in a medium favorable to cell growth and multiplication until a culture is secured which possesses sufficient enzymatic activity to ferment the main mash without the necessity of further cell growth or multiplication, inoculating said main mash with said culture, and allowing fermentation to proceed to completion.

6. The process of effecting fermentation of a mash which is fermentable by butyl-acetonic bacteria but which is unfavorable to cell growth or multiplication of said bacteria, which comprises cultivating said bacteria in a medium favorable to cell growth and multiplication until a culture is secured which possesses sufficient enzymatic activity to ferment the main mash without the necessity of further cell growth or multiplication, inoculating said main mash with said culture, and allowing fermentation to proceed to completion.

7. The process of effecting fermentation of a molasses mash which is fermentable by butyl-acetonic bacteria but which is unfavorable to cell growth or multiplication of said bacteria, which comprises cultivating said bacteria in a maize mash which is favorable to cell growth and multiplication until a culture is secured which possesses sufficient enzymatic activity to ferment the molasses mash without the necessity of further cell growth or multiplication, inoculating said molasses mash with said culture, and allowing fermentation to proceed to completion.

8. In a process for effecting fermentation of a mash which is fermentable by the organisms to be utilized but which is unfavorable to cell growth or multiplication of said organisms, the step which comprises inoculating said mash with a culture possessing sufficient enzymatic activity to ferment the entire mash without the necessity of further cell growth or multiplication.

9. In a process for effecting fermentation of a mash which is fermentable by butyl-acetonic bacteria but which is unfavorable to cell growth or multiplication of said bacteria, the step which comprises inoculating said mash with a culture of said butyl-acetonic bacteria possessing sufficient enzymatic activity to ferment the entire mash without the necessity of further cell growth or multiplication.

STEFAN BAKONYI.